Oct. 27, 1942.  I. J. SNADER  2,300,363
WORK-POSITIONING BACKLASH COMPENSATING DEVICE FOR MACHINE TOOLS
Filed May 29, 1940  4 Sheets-Sheet 1

Inventor
Ira J. Snader
BY
Parker, Carlson, Pitzner & Hubbard
Attorneys.

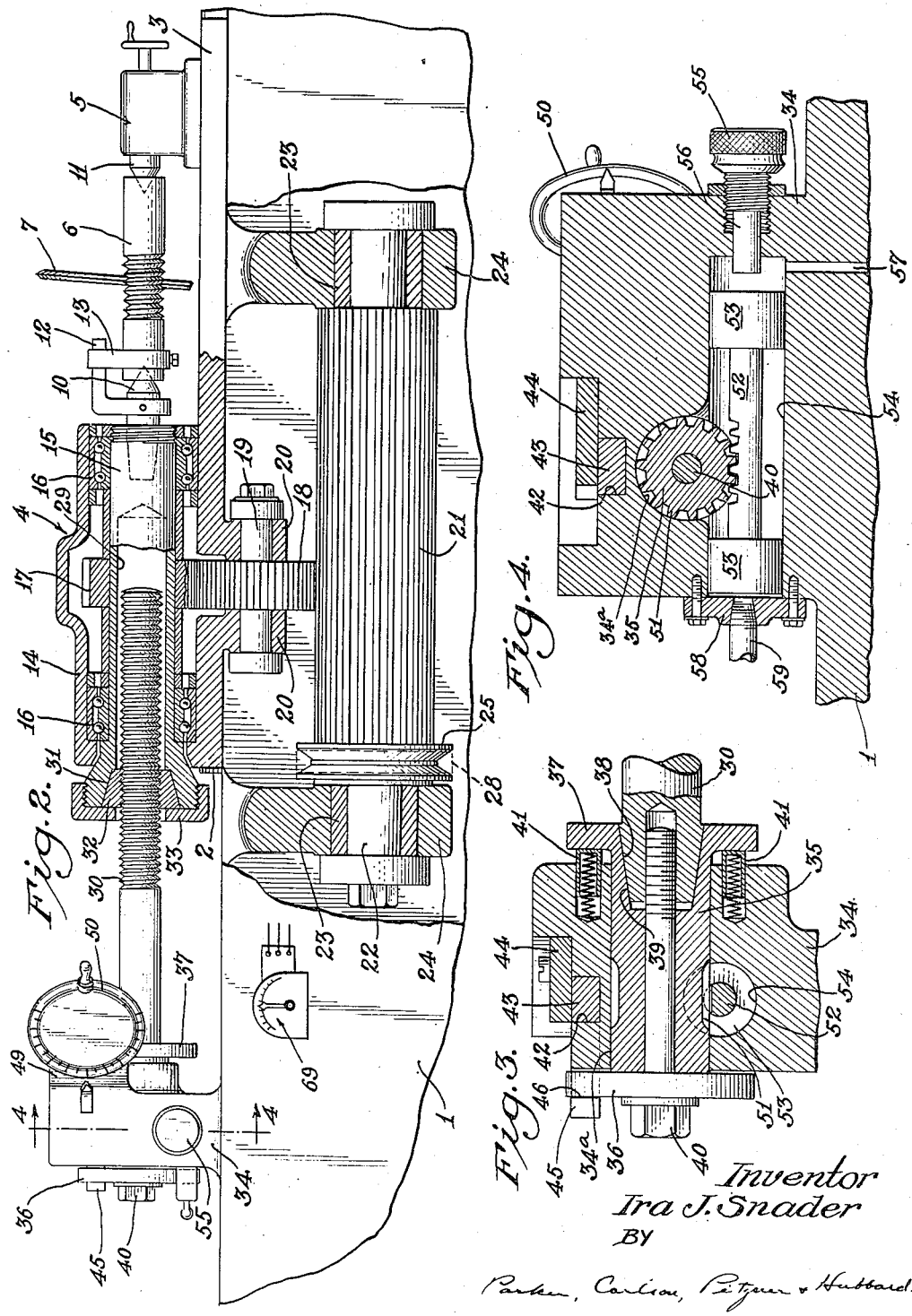

Oct. 27, 1942.  I. J. SNADER  2,300,363
WORK-POSITIONING BACKLASH COMPENSATING DEVICE FOR MACHINE TOOLS
Filed May 29, 1940  4 Sheets-Sheet 4

Inventor
Ira J. Snader
BY
Parker, Carlson,
Pitner & Hubbard
Attorneys.

Patented Oct. 27, 1942

2,300,363

UNITED STATES PATENT OFFICE 2,300,363

WORK - POSITIONING AND BACKLASH COMPENSATING DEVICE FOR MACHINE TOOLS

Ira J. Snader, Detroit, Mich., assignor to Ex-Cell-O Corporation, Detroit, Mich., a corporation of Michigan Application May 29, 1940, Serial No. 337,827

9 Claims. (Cl. 51—95)

The invention relates to work-positioning and backlash compensating devices for machine tools and more particularly to devices of this nature for machine tools in which a cutting operation is performed during each relative traverse of the worktable and the cutting tool. As an example of such a machine, reference may be had to the thread grinding machine disclosed in my copending application Serial No. 177,693, filed December 2, 1937.

An object of the invention is to provide a new and improved work-positioning and backlash compensating device for machine tools which is compact, embodies a simple and convenient means for positioning the workpiece relative to the cutting tool, and which accurately and rapidly compensates automatically for backlash.

Another object is to provide a novel device of this nature which includes means automatically responsive to reversals of the relative movement between the workpiece and cutting tool for compensating for backlash.

Another object is to provide a novel device of this character in which axial backlash compensating movement of a lead element is produced by a rotative movement of the compensating means.

Another object is to provide a new and improved work-positioning and backlash compensating device which includes a member having axial movement to position the workpiece and rotative movement to compensate for backlash.

Other objects and advantages will become apparent in the following description and from the accompanying drawings, in which:

Fig. 2 is a fragmentary front elevational view of the machine with certain parts thereof shown in longitudinal vertical cross section taken along the line 2—2 of Fig. 1.

Fig. 3 is a vertical axial view through the backlash compensating means taken as indicated by the line 3—3 in Fig. 1.

Fig. 4 is a transverse sectional view through the backlash compensating means taken along the line 4—4 of Fig. 2.

Figure 1:
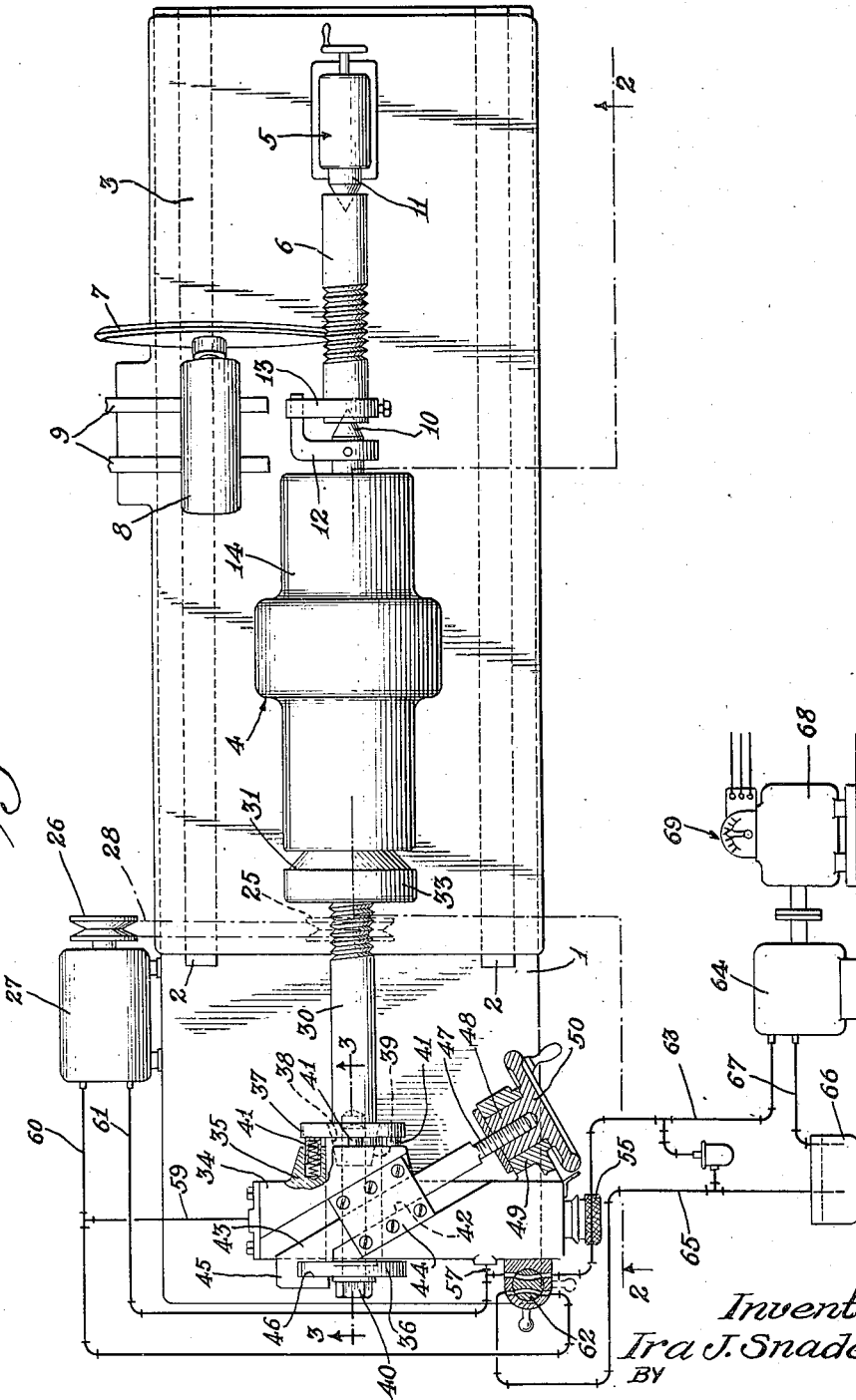
Figure 1 is a top plan view of a thread grinding machine having associated therewith a work-positioning and backlash compensating device embodying the features of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawings in which an exemplary form of machine embodying the invention is illustrated, the numeral 1 designates an elongated machine base having ways 2 extending longitudinally thereof for slidably supporting a table 3. A headstock and a tailstock, generally designated 4 and 5, respectively, are mounted on the table for supporting, rotating and translating a workpiece 6 in cutting relation with the grinding wheel 7. A motor 8, having a shaft on which the grinding wheel 7 is mounted, is slidably supported on ways 9 for movement transversely of the ways 2. The supporting means for the grinding wheel preferably includes suitable means (not shown) for effecting adjustment of the plane of rotation of the grinding wheel in accordance with the helix angle of the thread to be ground. The headstock and tailstock include conventional centers 10, 11, respectively, and the headstock center structure includes a driving pin 12 engageable with a dog 13 affixed to the work.

Referring particularly to Fig. 2, the headstock structure is located in an elongated tubular casing 14 arranged to support a spindle 15 through spaced bearings 16. A driving gear 17 is fixed to the spindle midway of its length for engagement with an idler gear 18 journaled on a shaft 19 supported by spaced bosses 20 depending from the under side of the table 3. The idler gear meshes with an elongated spur gear 21 which is fixed to a shaft 22 suported through bearings 23 in fixed parts 24 of the base 1. The spur gear 21 is driven in any suitable manner as by a pulley 25 rigid with the spur gear 21, a pulley 26 on the shaft of a main driving motor 27, and a connecting belt 28. The spindle 15 will thus be driven as the table 3 reciprocates.

The end of the spindle 15 opposite the center 10 has an axial bore 29 of substantial diameter therein to receive the end of a lead screw 30. A socket 31 on the associated end of the spindle receives a cooperating master lead screw nut 32 and such means as a cap nut 33 on the socketed end of the spindle detachably secures the master lead screw nut to the spindle. The lead screw 30 and the master lead screw nut 32 represent one pair of a series of similar elements of different pitches which are interchangeable to permit the lead screw and master nut to be matched with the pitch of the threads to be ground on the workpiece. By this construction rotation of the master lead screw nut with the spindle, while the lead screw is held against axial and rotational movement, will feed the workpiece past the grinding wheel at axial and rotational speeds proper to grind a thread of predetermined pitch on the workpiece.

The means by which the workpiece is initially positioned in accurate relation to the grinding wheel and by which compensation is made for backlash in the operating parts embodies a member having rotative and axial operating movements and associated with the outer end of the lead screw. A boss 34 extends upwardly from the base in substantial alinement with the headstock axis and in spaced relation to the lead screw end thereof. Slidably mounted in a bore 34ᵃ formed in the boss in axial alinement with the lead screw 30 is a cylindrical member 35 having enlarged disk-shaped heads 36 and 37 disposed on opposite sides of the boss. The outer end of the lead screw is detachably secured to the member 35 in any suitable manner as by providing a taper 38 on the end of the lead screw fitting a complementally tapered socket 39 in the adjacent end of the member 35 and held therein by a cap screw 40 extending through the member 35.

The cylindrical member 35 and the heads 36 and 37 form a unitary assembly which for convenience will be termed compensating means, since in the present embodiment the adjusting and compensating movements of the feed screw are effected through the axial and rotative movements of this member. It will be noted that the cylindrical member 35 is slightly longer than the width of the boss in which it is mounted, thus providing limited axial movement of the compensating means. The compensating means is yieldingly urged toward one limit of movement, and preferably toward the limit in which the outer disk-shaped head 36 is in abutment with the boss, by such means as a series of spring pressed plungers 41 seated in the boss to bear outwardly against the head 37.

The position of the work relative to the grinding wheel is accurately determined or adjusted by an axial movement of the compensating means. As may be seen in Figs. 1, 3 and 4, the top face of the boss has a groove 42 formed therein above the compensating means and extending angularly with respect to the axis thereof on a line which approximately crosses a portion of the periphery of the head 36. The groove receives an elongated slide bar 43 and an overlying plate 44 suitably secured to the boss holds the bar in place for longitudinal movement. One end of the bar is enlarged, as at 45 (Fig. 1), and has a slot 46 therein to receive the adjacent peripheral portion of the head 36. The other end of the bar is reduced and screw threaded, as at 47, for engagement with a nut 48 rotatably mounted in a bracket 49 on the boss. The nut is rigid with a handwheel 50.

Rotation of the nut moves the slide bar 43 longitudinally for adjusting the axial position of the compensating means and the lead screw against the yielding force exerted by the plungers 41. The angularity of the connection between the slide bar and the compensating means has the effect of reducing the motion transmitted to the compensating means from the slide bar so that highly accurate adjustments may be obtained. Preferably, the handwheel is graduated and, since the increments of movement per graduation will remain constant regardless of the pitch of the lead screw associated with the compensating means, the work piece may be readily checked to determine the location of the thread with respect to the headstock center by such means as an indicator-type bench fixture from which the proper setting of the handwheel may be obtained. By this construction, it is possible for the operator quickly to pick up the lead of a thread and to reproduce readily any particular workpiece.

The structure by which compensation for backlash is made is best seen in Figs. 3 and 4. The cylindrical member 35 of the compensating means has a pinion gear 51 formed thereon intermediate the heads 36, 37 for engagement by the teeth on a rack 52 slidably supported by heads 53 in a bore 54 which extends substantially normal to the bore 34ᵃ. The headed rack unit and the bore 54 form a piston motor by which the compensating means is rocked or oscillated in opposite directions as pressure fluid is admitted to one or the other of the ends of the bore 54. The extent of movement of the compensating means is determined by varying the stroke of the piston unit and in the present instance this result is accomplished by such means as an adjusting knob 55 screw threadedly engaging the boss and carrying a pin 56 which extends axially into the bore for movement limiting abutment with the end face of one of the pistons. Pressure fluid is admitted into this end of the bore behind the associated head through a passage 57. The other end of the bore is closed by a plate 58 secured to the boss and a pressure fluid conduit 59 communicates through the plate with the bore.

In certain types of thread grinding machines, the cutting operation is performed during the relative traverse of the workpiece and grinding wheel in each direction. The present mechanism may be used to particular advantage in such a machine since the necessary movement to compensate for backlash may be automatically transmitted to the lead screw concurrently with either reversal of the relative movement between the workpiece and cutter. Fig. 1 illustrates diagrammatically the connection of the present compensating means in such a machine.

The motor 27 is a reversible hydraulic motor to which fluid under pressure may be supplied through feed lines 60 or 61. These lines lead to a two-way reversing valve 62 by which one of the lines 60 or 61 is connected with a pressure line 63 from a pump 64 while the other line is connected with a return line 65 to a supply tank 66. A pump intake line 67 leads from the supply tank to the pump. The pump is driven by a motor 68 having speed control means 69 associated therewith. The ends of the cylinder 54 are connected in multiple with the motor feed lines 60 and 61, in this instance the conduit 59 being connected with line 60 and passageway 57 with line 61. Hence, when the valve 62 is moved to reverse the connections of the feed lines 60 and 61 to the motor, the same reversal occurs in the piston motor. However, since the inertia of the motor 27 and the elements driven thereby is much greater than that of the piston motor and its associated parts, the piston motor will complete its movement to compensate for backlash in the lead screw prior to the reversal of worktable movement. Compensation for backlash will, therefore, be made concurrently with the reversal of each translatory movement of the worktable.

Compensation for backlash by means of a rotary movement of the lead screw is highly accurate because of the comparatively long rotative movement required to produce a relatively short axial compensatory movement. For example, assume that in the illustrated mechanism the master lead screw, its coacting nut and the work spindle bearings have a cumulative axial backlash in the amount of .005". If the lead screw has a pitch of .100" (10 threads per inch), a rotational movement of the lead screw through an arc of 18° will be the equivalent of the axial movement required to take up the .005" of backlash. By adjustment of the pin 56, the stroke of the piston motor may be fixed to produce an 18° rotative movement of the compensating means and the lead screw at each reversal of the machine tool. Since this compensating movement occurs before the reversed movement of the worktable begins, it will be evident that the proper relationship between the cutter and the workpiece will be positively maintained.

Figure 5:
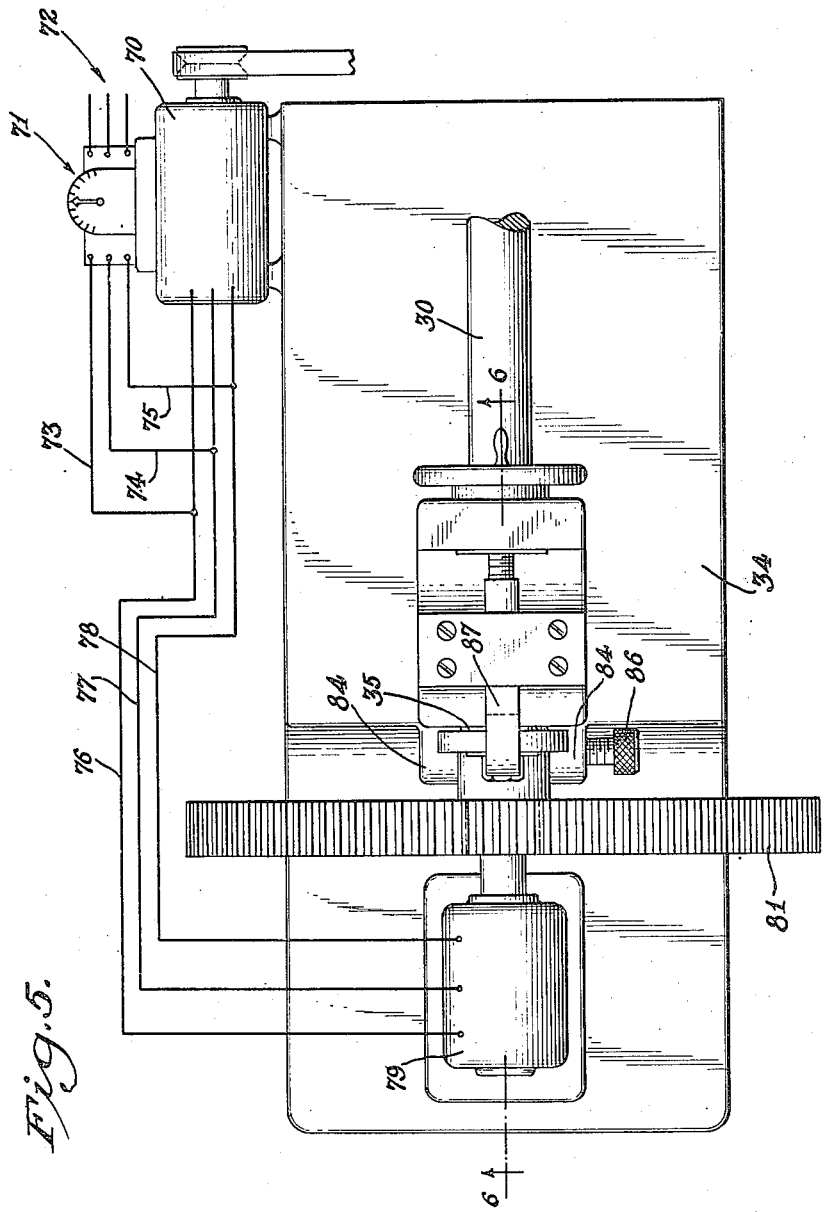
Fig. 5 is a plan view of a modified form of work-positioning and backlash compensating means.
Figure 6:
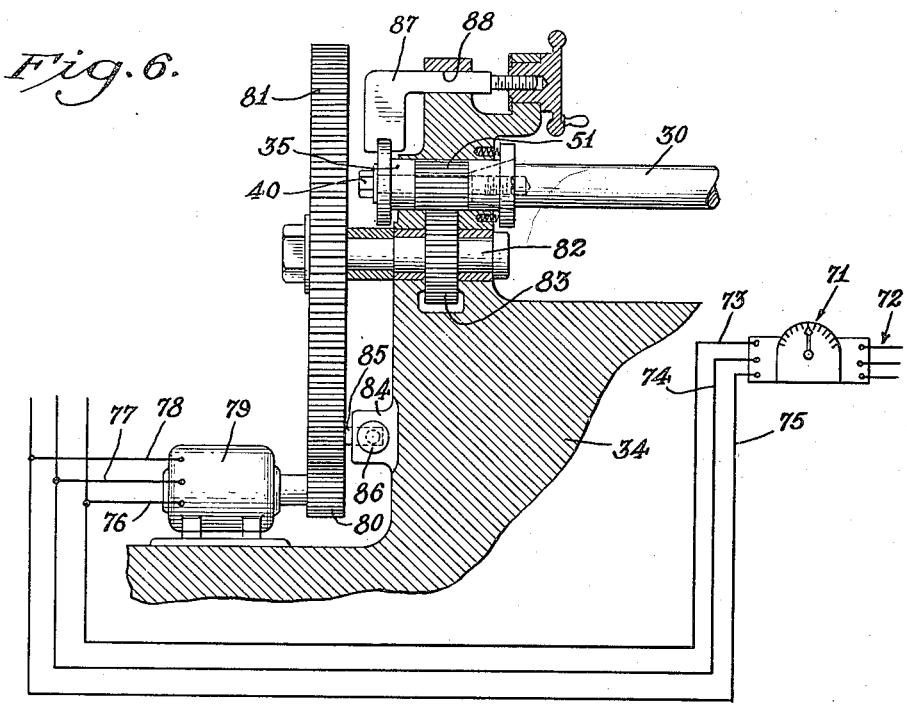
Fig. 6 is a vertical axial section through the modified means along the line 6—6 of Fig. 5.
Figure 7:
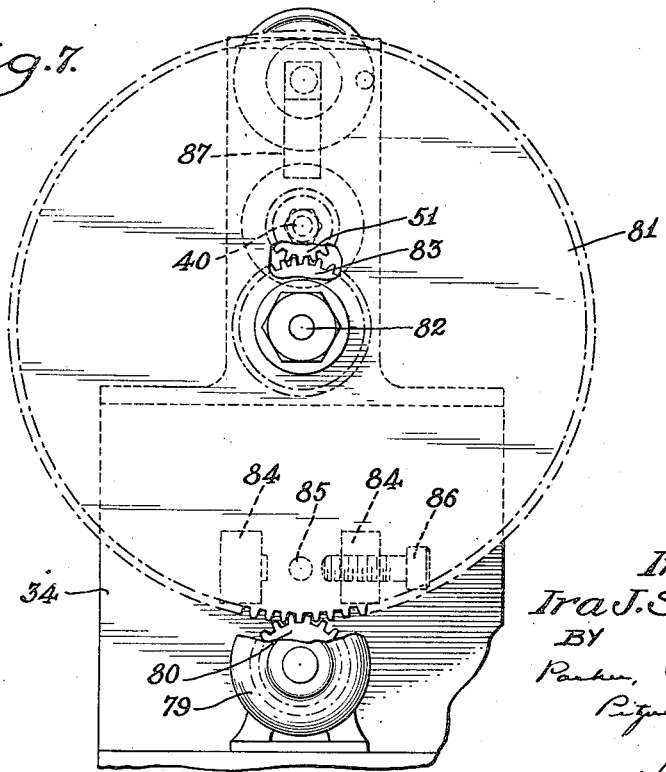
Fig. 7 is an end elevational view looking toward the left-hand end of the mechanism as shown in Fig. 6 and with certain parts of the structure broken away.

Figs. 5, 6 and 7 illustrate a modified form of compensating means adapted primarily for use in a machine tool which is driven by a reversible electric motor instead of by an hydraulic motor. In such a machine, an electric driving motor 70 has associated therewith a speed control and reversing means 71 to which supply lines 72 are connected and from which conductors 73, 74 and 75 lead to the motor 70. Branch conductors 76, 77 and 78 from conductors 73, 74 and 75, respectively, connect an electric motor 79 in parallel or multiple with motor 70. In operation, the motor 79 corresponds to the hydraulically actuated piston unit in the structure shown in Figs. 1 to 4 and is a torque motor particularly adapted to develop a static holding torque in either rotational direction without damage to the motor, even though the motor is permitted but a limited rotational movement at the time of its conjoint reversal with the motor 70 and thereafter remains stalled.

As shown in Figs. 6 and 7, the shaft of motor 79 carries a pinion 80 in mesh with a large gear 81 supported by a shaft 82 that is journaled in the boss 34. A gear 83 on the shaft 82 engages the gear teeth 51 on the cylindrical member 35 of the compensating means. For adjustably limiting the extent of the rotational movement imparted to the compensating means by the motor 79, the boss 34 carries a pair of outstanding ears 84 disposed adjacent to a side face of the gear 81 and spaced apart in the direction of rotary movement of said gear. A stop pin 85 projects from the gear 81 into the space between the ears 84 and one of the ears carries an adjusting screw 86 for abutment with the stop pin variably to limit the extent of rotary movement of the gear 81.

As will be readily understood, the electrically driven backlash compensating means operates in the same manner as does the comparable hydraulically-actuated structure illustrated in Figs. 1 to 4. The torque motor 79 will reverse simultaneously with reversals of the main driving motor 70 to rotate the compensating unit and the lead screw through an arc predetermined by the adjusting screw 86. As in the case of the hydraulically-controlled compensating means, the electrically-controlled structure has very little inertia compared with that of the main driving motor 70 and its associated mechanism, whereby the compensation for backlash is made prior to reversal of the elements driven by the main driving motor.

It may be noted in Fig. 6 that the work-positioning means illustrated therein differs slightly from the structure shown in Figs. 1 to 4. However, the modified form differs only in the manner of supporting the slide bar on the boss. Thus, the slide bar 87 (Fig. 6) extends through an aperture 88 which extends through a part of the boss in a direction paralleling the axis of the compensating unit. The position of the slide bar 87 is adjusted by means similar to that previously described.

I claim as my invention:

1. In a work-positioning and backlash compensating device for machine tools, in combination, a supporting boss, a cylindrical member loosely mounted on said boss and adapted for connection with the lead screw of the machine tool, heads on opposite ends of said member for limiting abutment with said boss, spring means urging said cylindrical member in one direction, a slide bar engaging one of said heads for moving said cylindrical member against the force of said spring means, means for adjusting the position of said slide bar, a gear on said cylindrical member, a piston having a rack engaging said gear, a cylinder in which said piston is reciprocable, means for moving said piston in each direction, and means for variably determining the length of the piston stroke.

2. In a backlash compensating device for machine tools, in combination, a supporting boss, a cylindrical member rotatably mounted on said boss and adapted for connection with the lead screw of the machine tool, a gear on said cylindrical member, a piston motor including a rack engaging said gear, means for driving said piston motor in opposite directions, and means for variably determining the length of the piston motor stroke.

3. In a backlash compensating device for machine tools, in combination, a supporting boss, a cylindrical member rotatably mounted on said boss and adapted for connection with the lead screw of the machine tool, a gear on said cylindrical member, a reversible electric motor capable of developing a static holding torque, a gear train drivingly connecting said motor with said gear on the cylindrical member, and adjustable means for limiting the extent of rotative movement of said cylindrical member.

4. In a work-positioning and backlash compensating device, in combination, a member supported for axial and rotative movement and adapted to be drivingly connected with the rotary feed element of a machine tool, means for adjusting the axial position of said member, means for rotating said member prior to operation of the feed element to compensate for backlash, and means for limiting the extent of rotary movement to that required to compensate for a predetermined amount of backlash.

5. In a work-positioning and backlash compensating device for a machine tool which is characterized in that a cutting operation is performed during each relative translation of a workpiece and a cutting tool, the combination of an axially adjustable and rotatably supported member adapted to be connected with the rotary feed element of the machine tool, means for axially moving said member to correlate properly the relative positions of the workpiece and cutting tool, driving means for rotating said member through an arc predetermined to produce the axial movement required to compensate for a known amount of backlash, and means for actuating said driving means at each reversal of the relative translation between the workpiece and cutting tool.

6. In a backlash compensating device for a machine tool which is characterized in that a cutting operation is performed during each relative translation of a workpiece and a cutting tool, the combination of a rotatably supported member adapted to be drivingly connected with the rotary feed element of the machine tool, driving means for rotating said member through an arc predetermined to produce the axial movement required to compensate for a known amount of backlash, and means for actuating said driving means at each reversal of the relative translation between the workpiece and cutting tool.

7. In a backlash compensating device for a machine tool which is characterized in that a cutting operation is performed during each relative translation of a workpiece and a cutting tool and in that such translation is produced by a hydraulically actuated reversible prime mover, the combination of a rotatably supported member adapted to be drivingly connected with the rotary feed element of the machine tool, hydraulically actuated driving means for rotating said member through an arc predetermined to produce the axial movement required to compensate for a known amount of backlash, and means connecting said driving means and said prime mover for concurrent reversal.

8. In a backlash compensating device for a machine tool having a lead screw, the combination of a rotatable member arrange for driving connection with said feed screw, means for rotating said member, and means for predetermining the rotative movement of said member to that movement which will shift the parts driven by the feed screw axially thereof to the extent of the backlash in the relatively movable parts.

9. In a backlash compensating device for a machine tool having a lead screw and means associated with said lead screw having relative movements in opposite directions controlled by said lead screw, the combination of a rotatable member arranged for driving connection with said lead screw for rotating said lead screw through the angular distance required to produce the axial displacement necessary to compensate for a known amount of backlash, means for rotating said member, means for predetermining the rotative movement of said member to that required to produce the backlash compensating rotary movement of said lead screw, means for reversing the direction of movement of the means associated with said lead screw, and means operative at each reversal for concurrently driving said rotatable member, the inertia of the parts associated with the lead screw being substantially greater than that of said rotatable member and the parts associated therewith so that the driven movement of said rotatable member after each reversal will be completed before the reverse movement of the means associated with said lead, screw commences.

IRA J. SNADER.